United States Patent [19]

Calmettes

[11] Patent Number: 5,108,137
[45] Date of Patent: Apr. 28, 1992

[54] COUPLING FOR RAPIDLY CONNECTING A TUBE

[75] Inventor: Lionel Calmettes, Romorantin Lanthenay, France

[73] Assignee: Etablissements Caillau, Issy Les Moulineaux, France

[21] Appl. No.: 419,758

[22] Filed: Oct. 11, 1989

[30] Foreign Application Priority Data

Oct. 14, 1988 [FR] France .................. 88 13591
Feb. 27, 1989 [FR] France .................. 89 02526

[51] Int. Cl.$^5$ ............................................. F16L 39/04
[52] U.S. Cl. .................... 285/320; 285/331; 285/423; 285/902
[58] Field of Search ............... 285/902, 320, 317, 423, 285/331

[56] References Cited

U.S. PATENT DOCUMENTS

| | | | |
|---|---|---|---|
| 2,360,732 | 10/1944 | Smith . | |
| 2,912,260 | 11/1959 | Wray | 285/317 X |
| 3,124,375 | 3/1964 | Maisch | 285/317 |
| 3,603,619 | 9/1971 | Bengesser . | |
| 4,221,405 | 9/1980 | Stonitsch | 285/423 X |
| 4,293,149 | 10/1981 | Bonel . | |

FOREIGN PATENT DOCUMENTS

1403312 12/1965 France .
1535163 6/1968 France .
0768326 2/1957 United Kingdom .

*Primary Examiner*—Dave W. Arola
*Attorney, Agent, or Firm*—Lewis H. Eslinger; Jay H. Maioli

[57] ABSTRACT

This invention relates to a coupling for rapidly connecting a tube made of rigid material such as metal, of semi-rigid material, such as a plastics material. The coupling presents, at one end adapted to receive the tube, a bore whose diameter is substantially equal to the outer diameter of the tube, said bore being provided with at least one supple sealing means capable of coming into contact with one of the walls of the tube. Between the inlet orifice of the bore and the sealing means, the coupling comprises a housing which receives, for stopping the tube, a retractable member which is locally immobilized therein in the axial direction. The coupling and the seal of its bore are made of the same material, in a single moulding operation.

9 Claims, 2 Drawing Sheets

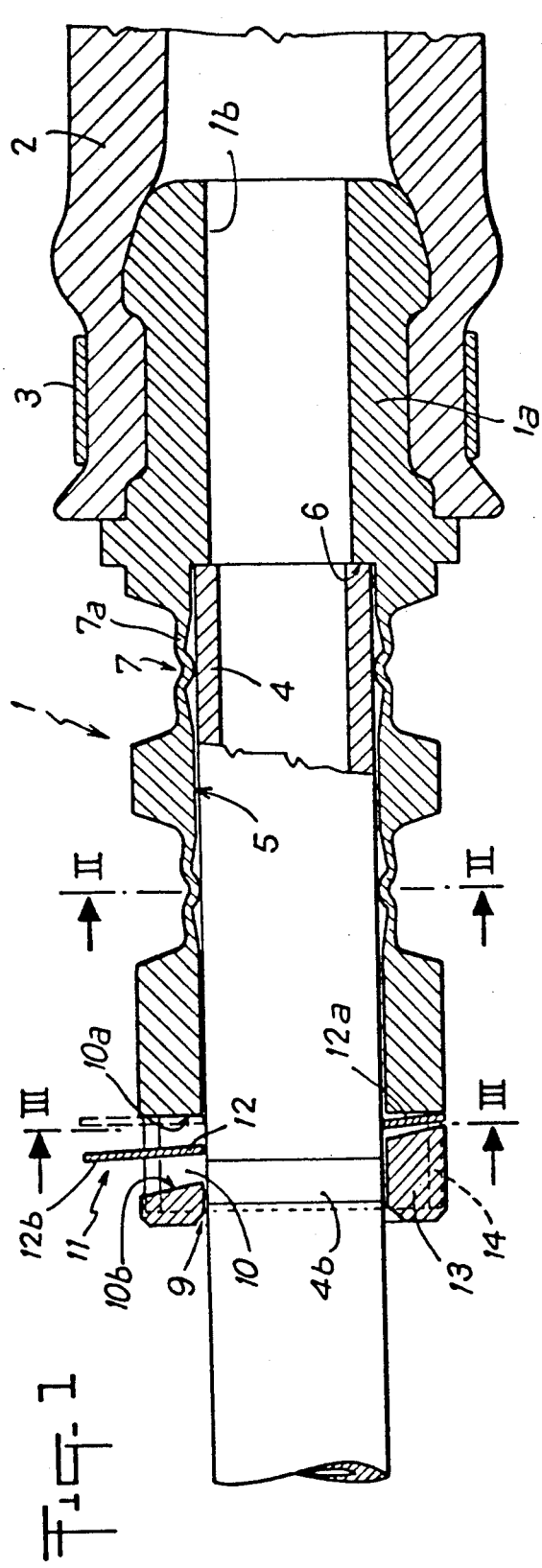
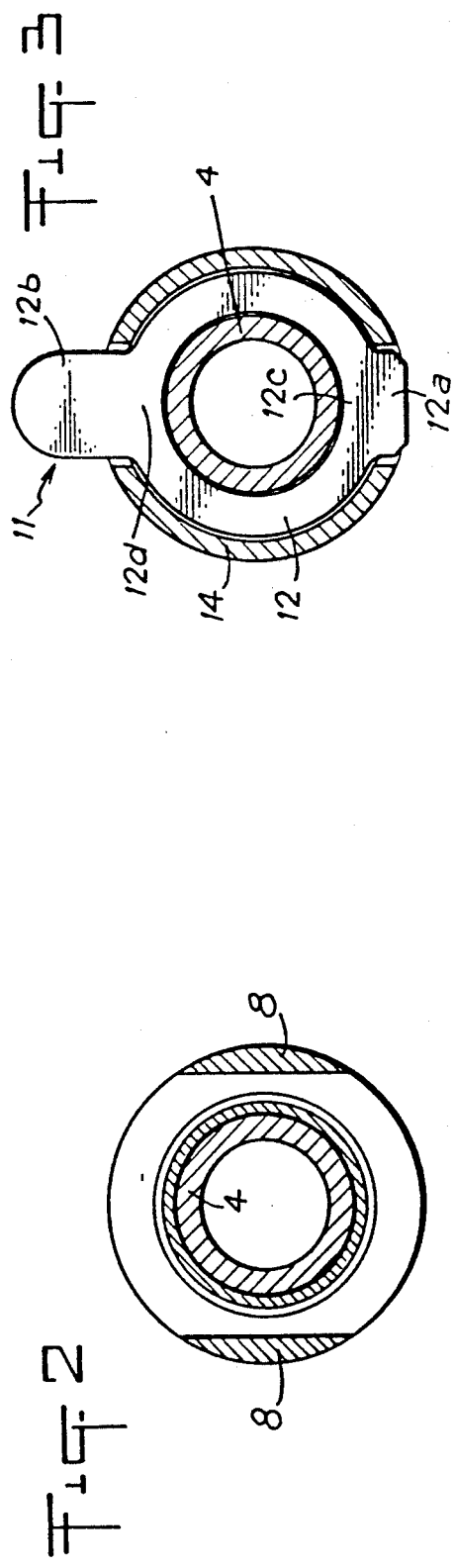

COUPLING FOR RAPIDLY CONNECTING A TUBE

FIELD OF THE INVENTION

The present invention relates to a coupling for rapidly connecting a tube.

BACKGROUND OF THE INVENTION

It is frequently necessary, particularly in automobile construction and more generally in mass-production construction industries, to have available means, if possible easy to dismount, for rapidly joining together two tubes or pipes.

This is the case, for example, in car assembly, when the various elements constituting a conduit conveying a fluid, either petrol or cooling liquid for an engine, are to be connected.

A duct element generally comprises a supple or even semi-rigid pipe, fitted on a coupling to which it is hermetically fixed by any appropriate means, for example by a clamp. If two duct elements are fitted on the same coupling and are fixed thereto by clamps, it is relatively long and expensive to make the connection; moreover, dismantling may require the destruction of at least one of the clamps.

On the other hand, it is known to be advantageous to automatize, as much as possible, the various steps of mounting complex assemblies such as vehicles. However, it is indispensable, in that case, particularly concerning the connection of the duct elements, to limit the operations to simple movements, for example of translation, and to avoid the necessity of a specific orientation about an axis, in particular the axis of a translation.

Patents FR-A-1 535 163 and 1 403 312 and U.S. application 2 360 732, in particular, already disclose dismountable devices for rapidly joining together two pipes or sections of tubing. They generally comprise a coupling presenting, at one end adapted to receive a tube, a bore whose diameter is substantially equal to the outer diameter of the tube. This bore is provided with at least one supple sealing means capable of coming into contact with one of the walls of the tube. On the other hand, between the inlet orifice of the bore and the sealing means, the coupling comprises a housing which receives, for stopping the tube, a retractable member which is locally immobilized therein in the axial direction.

Such connection devices present numerous advantages, and in particular the easy positioning or dismantling thereof. In addition, the coupling may present two or more bores each associated with a member for stopping a tube, two tubes thus being connected in the same manner in each bore of the coupling.

However, the requirements of modern techniques and in particular the conditions of seal imposed in the case of the fluids conveyed being under pressure and possibly at high temperature, in practice often prevent the use of the known devices described hereinbefore: this is due in particular to the fact that the supple sealing means present physical characteristics different from those of the coupling, thus provoking phenomena of differential expansion which are detrimental to maintaining the tightness of the connection.

The invention provides a simple solution to the difficulty which has just been demonstrated and, in addition, allows various reliable embodiments, each presenting its own advantages.

SUMMARY OF THE INVENTION

According to the invention, the coupling and the seal of its bore are made of the same material, in a single moulding operation.

In practice, this material will advantageously be a plastics material; numerous materials are known to exist which are capable of being moulded whilst presenting a suitable resistance to various chemical agents likely to be conveyed in the tubes to be joined.

According to a first variant embodiment, the supple sealing means projects inside the bore of the coupling.

According to a second, particularly advantageous variant embodiment, a tubular extension is disposed inside the bore of the coupling and its outer diameter is substantially equal to the inner diameter of the tube to be joined. This tubular extension, generally moulded with the coupling, defines a housing in the form of a tubular groove for the end of the tube to be connected and comprises at least one sealing means on its outer wall.

BRIEF DESCRIPTION OF THE DRAWINGS

The invention will be more readily understood on reading the following description with reference to the accompanying drawings, in which:

FIG. 1 is a view in section of a coupling according to the invention, a tube being joined to said coupling.

FIG. 2 is a section along II—II of FIG. 1.

FIG. 3 is a section along III—III of FIG. 1, the stop device being assumed to be in its inactive position.

DETAILED DESCRIPTION OF THE DRAWINGS

Figure 4:
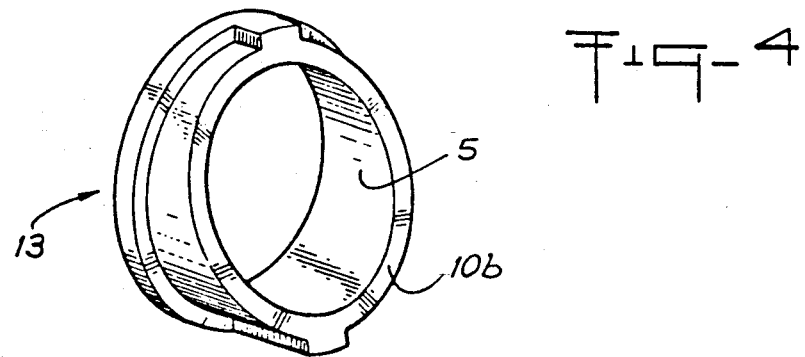
FIG. 4 is a view in perspective of a plug intended to constitute the end of the coupling.

Referring now to the drawings, and firstly to FIGS. 1 to 4, a coupling is designated by general reference 1, the rear part 1a of which (located to the right in FIG. 1) is shaped so that a supple tube 2 is fixed thereon by a clamp 3.

The left-hand part of the coupling 1 is adapted to receive a rigid or semi-rigid tube 4. Coupling 1 is itself preferably made of moulded plastics material and presents a bore 5 whose diameter is very close to that of the tube 4, but at least equal thereto. The inner end of the bore comprises a shoulder 6 constituting an axial stop for the tube 4; obviously, bore 5 communicates with the conduit 1b made in the rear part 1a of the coupling.

Starting from the shoulder 6 and going towards the entrance of the bore 5, located to the left in FIG. 1, there is firstly located at least one sealing means 7 whose inner diameter in the free state is at the most equal to and preferably slightly less than that of the tube 4 which is to be received by the coupling. As shown in the embodiment illustrated, there are preferably two sealing means 7, each being constituted by a thin wall 7a of the coupling, suitably formed in its central part and moulded therewith.

Due to the reduced mechanical strength of the coupling in the region of the sealing means 7, it may be necessary to provide reinforcements 8, such as those shown in FIG. 2, longitudinally joining the thick parts of the wall of the coupling.

Between the last of the sealing means and the inlet orifice 9 of the bore, there is provided a housing 10 in which is disposed a device for stopping the tube 4, designated by reference 11.

The stop device 11 is essentially constituted by a retractable member capable of coming into contact with the tube 4 and of engaging thereon, this member being locally immobilized in housing 10 by any suitable means.

In the example shown, the housing 10 is wedge-shaped, one of its flat faces 10a, preferably the one located opposite orifice 9, being perpendicular to the axis of the bore 5, whilst the other, 10b, is inclined with respect to this axis. The stop device 11, clearly visible in FIG. 3, is advantageously made in the form of a thin, deformable ring 12, for example made of metal, presenting two radial appendices 12a and 12b, diametrically opposite each other. The inner diameter of the ring 12 is as close as possible to the outer diameter of the tube 4 which is to be received by the coupling.

Appendix 12a of the stop device and the adjacent zone 12c of the ring 12 are, as clearly shown in FIG. 1, located in the narrowest region of the wedged-shaped housing 10, with the result that they are virtually immobilized in the axial direction. On the contrary, zone 12d of the ring, diametrically opposite appendix 12a, as well as appendix 12b itself, are located in a wide region of the housing 10 in which they may move between faces 10a and 10b of the housing. Appendix 12b is of sufficient dimensions to constitute a radial tongue projecting with respect to the outer surface of the coupling. The reasons for this arrangement will appear hereinbelow.

Finally, it will be noted that the narrowest region of housing 10 and/or the shape of device 11 are determined so that, in the inactive position and in the absence of tube 4, device 11 is in the position shown in solid lines in FIG. 1, or even comes into abutment on face 10b of housing 10. For example, device 11 may be slightly cambered, particularly if appendix 12a lies in a diametral plane.

In order easily to make housing 10 and place the retractable stop device 11 therein, it may be advantageous to constitute the inlet end of the bore 5 in the form of a plug 13, illustrated in FIG. 4. This plug comprises, of course, the inlet orifice 9 of the bore 5 and its inner face is preferably flat and inclined with respect to the axis of the orifice 9 in order to constitute, after being positioned, face 10b of the housing 10. Beyond face 10a of the housing 10, the coupling presents a cylindrical extension 14, shown in section in FIG. 3, adapted to receive the plug 13 which will be fixed thereto by any appropriate means, for example by gluing.

Figure 5:
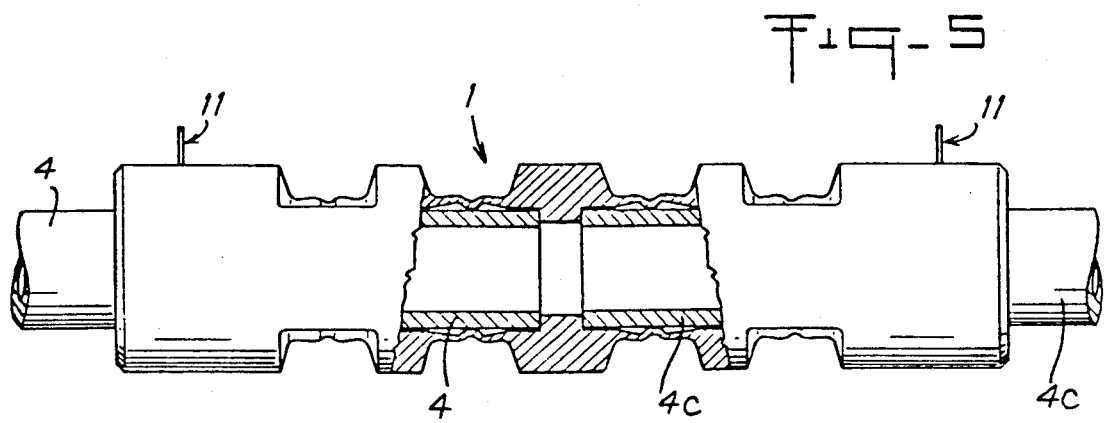
FIG. 5 and FIG. 6 are views similar to FIG. 1 in the case of a first and a second variant embodiment of the coupling.

Before explaining the functioning of the coupling when tube 4 is placed in position, it will be indicated, with reference to FIG. 5, that a coupling according to the invention may comprise two parts identical to the one which has just been described in detail. These two parts are opposite each other and make it possible to receive at each free end of the coupling, a tube 4 or 4a whose positioning consequently requires no connection with the aid of a clamp.

Figure 6:
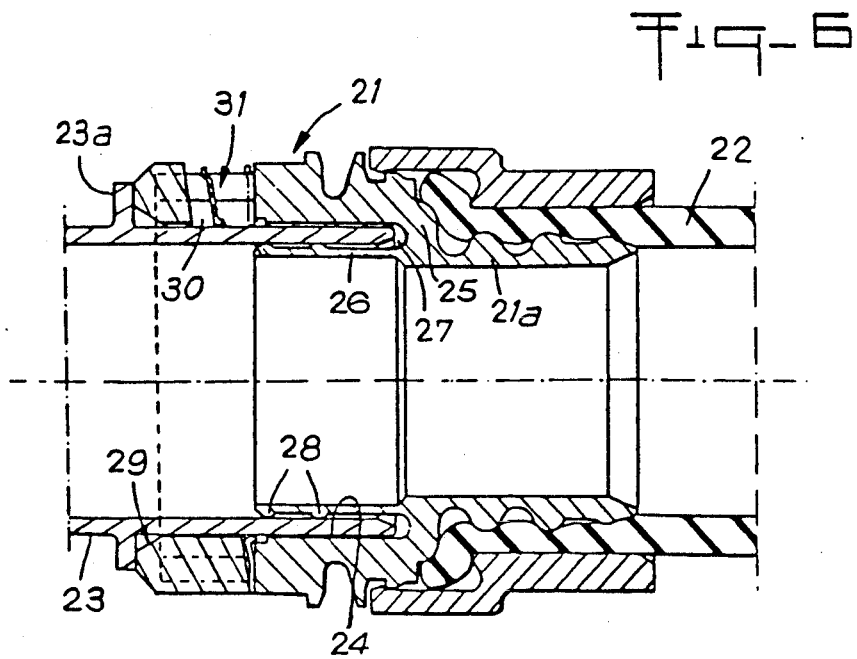

FIG. 6 shows another variant embodiment in which a coupling is designated by general reference 21. Its rear part (located to the right in FIG. 6) is shaped so that a supple pipe 22 is fixed thereon by any appropriate means. In the embodiment shown in this Figure, the supple pipe is fixed in the manner described in Applicants' French Patent Application No. 89 02525 filed on Feb. 27, 1989 and relating to a coupling for supple pipe and process for assembling same.

The left-hand part of coupling 21 is intended to receive a rigid or semi-rigid tube 23. Coupling 21 is itself preferably made of moulded plastics material and presents a bore 24 whose diameter is very close to the outer diameter of tube 23, but at least equal thereto. The inner end of the bore comprises a shoulder 25 which may constitute an axial stop for tube 23; of course, bore 24 communicates with the conduit 21a made in the rear part of the coupling.

Starting from shoulder 25 and going towards the entrance of bore 24, located to the left in FIG. 6, there is provided a tubular extension 26 whose inner diameter is close to that of conduit 21a. However, the outer diameter of this extension is at the most equal to the inner diameter of tube 23, with the result that a housing 27 exists, in the form of a tubular groove capable of receiving the end of tube 23.

Tightness of the connection between tube 23 and coupling 1 is ensured by means of at least one sealing means 28 which is located on the outer wall of the tubular extension 26 and moulded therewith at manufacture of the coupling. Of course, the outer diameter of sealing means 28 is slightly larger than the inner diameter of tube 23.

Between the last of the sealing means 28 and the inlet orifice 29 of the bore, there is provided a housing 30 in which lies a device for stopping the tube 23, designated by reference 31 and similar to the one described hereinabove with reference to FIGS. 1 to 4.

Positioning of tube 4 will now be explained with reference to FIG. 1.

Tube 4, whose diameter corresponds to that of bore 5 of the coupling, is introduced into orifice 9 and is driven into the bore until it reaches shoulder 6 constituting stop. In order to allow the operator to check penetration visually, tube 4 preferably presents a mark 4b, for example a coloured band, which disappears from view when tube 4 reaches stop 6.

During its penetration, tube 4 has firstly traversed the central hole of the ring 12 constituting the stop device 11 which, if necessary, has been pushed by the tube itself until it is in abutment on face 10a of the wedge-shaped housing 10. In this position, shown in broken lines in FIG. 1, the central hole of the ring 12 is in fact coaxial to the bore 5, with the result that the stop device 11 does not oppose penetration of tube 4.

When tube 4 has cleared the stop device 11, the latter resumes its initial position, under the effect of its elasticity, in its plane or in an adjacent position such as the one shown in solid lines in FIG. 1. The inner edge of zone 12d is then in abutment on the outer surface of tube 4.

Continuing its displacement towards the stop 6, the tube 4 encounters the two sealing means 7. Thanks to the suppleness of the walls 7a, the annular part of the sealing means allows the tube to pass, whilst ensuring a sealed contact therewith.

When the tube attains stop 6, its positioning is terminated and it has required no other operation than the penetration of the tube itself in bore 5.

As has already been indicated, the tightness of the connection is obtained by the contact of the sealing means 7 and the outer surface of tube 4, whilst maintenance of the tube in the bore 5 is ensured by the stop device 11. In fact, if it is assumed that a tearing effort is exerted on the tube 4, the zone 12d (FIG. 3) of the device 11 is instantaneously anchored in the outer surface of the tube 4 and avoids virtually any displacement of the latter in the direction of its extraction from bore 5, by reason of the axial immobilization of appendix 12a and zone 12c of the ring. The more the tearing effort increases, the greater the anchoring of device 11 in tube 4 becomes.

It will be noted here that the device for stopping the tube opposes, as has just been stated, any displacement of the tube towards the outside, whatever the origin: it obviously avoids an accidental tearing of the tube on which an effort of traction might be exerted, but, in particular, it opposes the efforts of expulsion provoked by the action of the pressure of the fluid conveyed by the tube.

However, it may be necessary to dismantle the tube 4 and to remove it from the coupling 1. To that end, the operator maintains the stop device 11 in abutment on face 10a of the housing 10, by means of appendix 12b, in the position shown in broken lines in FIG. 1. Extraction of tube 4 is then possible without any difficulty since the stop device has been retracted and neutralized.

In the case of the variant embodiment shown in FIG. 6, tube 23 is placed in position similarly to the manner which has just been described with reference to FIG. 1.

Tube 23, whose diameter corresponds to that of bore 24 of the coupling and which presents a flange 23a forming stop, is introduced into orifice 29 and is driven into the bore until the flange 23a comes into abutment on orifice 29. Of course, the length of the tube 23 between its end and its flange 23a has been determined so that the end of the tube reaches the bottom of the housing 27. If, however, the tube does not comprise a flange, it will have to be driven into the coupling until it comes into abutment on shoulder 25. Marks on the tube will then be advantageously provided to allow the operator to check penetration visually.

During its penetration, the tube 23 has firstly traversed the central hole of the stop device 31. Continuing its displacement towards the housing 27, the tube 23 encounters the two sealing means 28. Thanks to the suppleness of the wall of the tubular extension 26, the annular part of the sealing means allows the tube to pass whilst ensuring a tight contact therewith.

The observations set forth hereinabove with regard to the embodiment of FIGS. 1 to 4 are, of course, applicable to the variant embodiment according to FIG. 6, both concerning the reliable connection and the easy dismantling thereof.

What is claimed is:

1. A coupling for rapidly connecting and sealing a tube, said coupling representing, at one end adapted to receive the tube, a bore whose diameter is substantially equal to the outer diameter of the tube, said bore being provided with at least one supple sealing means for coming into contact with one of the walls of the tube, and between the inlet orifice of the bore and the sealing means is arranged a housing which receives, means for stopping the tube, said means for stopping includes a retractable member which is locally immobilized therein in the axial direction by the location thereof between the inlet orifice and an end of the housing, the coupling and the sealing means of its bore are made of the same material, and are of unitary construction formed in a single moulding operation.

2. The coupling of claim 1, wherein the supple sealing means projects inside the bore.

3. The coupling of claim 1, wherein a tubular extension is disposed inside the bore whose outer diameter is substantially equal to the inner diameter of the tube, said tubular extension thus defining a housing in the form ob a tubular groove for he end of the tube, and at least one sealing means is provided on the outer wall of the tubular extension.

4. The coupling of claim 1, wherein the housing is annular in shape and includes two spaced apart flat faces at opposite ends of the annular shaped housing, one of said flat faces being perpendicular and the other of said flat faces being inclined with respect to the axis of the bore.

5. The coupling of claim 4, wherein said coupling comprises, at its free end, a plug which is immobilized thereon, the inner flat face of said plug being inclined with respect to the axis of the bore and constituting said inclined face of the wedge-shaped housing.

6. The coupling of claim 4, wherein said retractable member for stopping the tube is constituted by a resistant, thin and deformable element presenting at least one zone mobile in a space between said inclined flat face of said annular shaped housing and said one end of said coupling and a zone axially immobilized between the inclined face of said housing and said one end of said coupling, said two zones being diametrically opposite each other and separated by a distance substantially equal to the diameter of the bore.

7. The coupling of claim 6, wherein the deformable element is constituted by a deformable washer of which the inner diameter is substantially equal to that of the bore.

8. The coupling of claim 1, wherein said tube is made of rigid, metal material.

9. The coupling of claim 1, wherein said tube is made of semi-rigid, plastic material.

* * * * *